Figure 1:
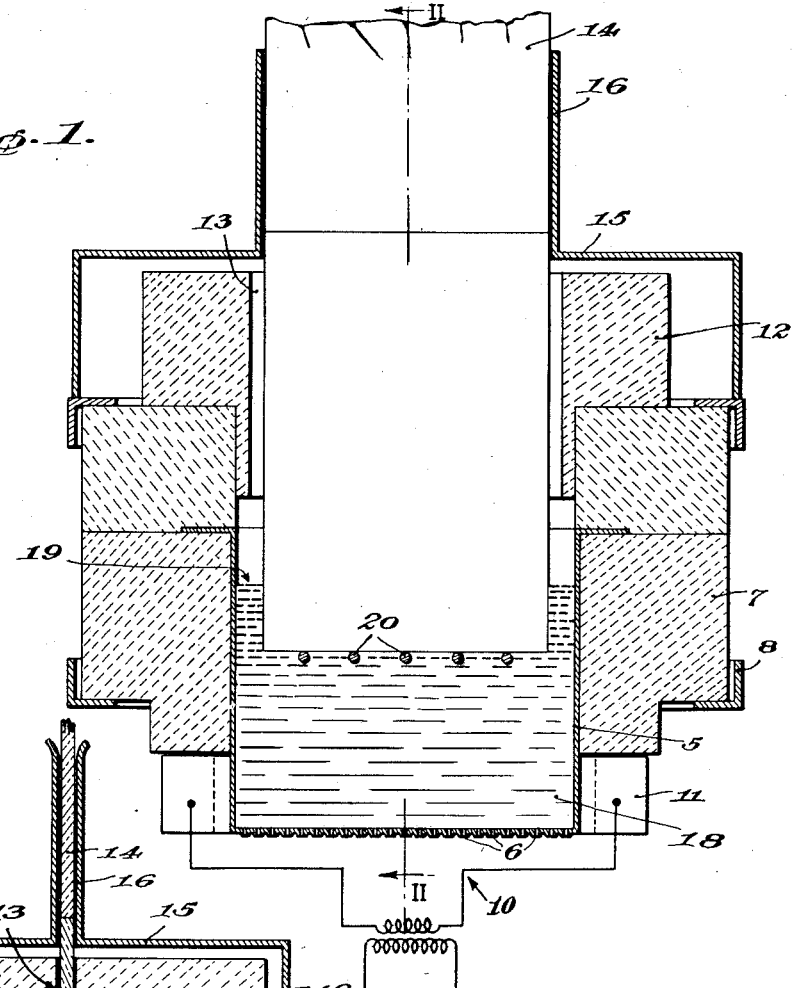

June 16, 1942.  C. SIEGFRIED  2,286,653

METHOD AND APPARATUS FOR FEEDING GLASS STOCK

Filed March 28, 1939

INVENTOR.
Claus Siegfried
BY
ATTORNEY

Patented June 16, 1942

2,286,653

UNITED STATES PATENT OFFICE 2,286,653

METHOD AND APPARATUS FOR FEEDING GLASS STOCK

Claus Siegfried, Dusseldorf, Germany, assignor to Owens-Corning Fiberglas Corporation, a corporation of Delaware Application March 28, 1939, Serial No. 264,602
In Germany March 29, 1938

8 Claims. (Cl. 49—53)

The present invention relates to a method and apparatus for feeding glass stock into a supply body of molten glass and forming a part thereof. The invention finds particular use in the establishment of a supply body of molten glass for the production of fibrous glass for textile purposes. Such supply body of necessity should be as seed-free as possible and at a constant and uniform temperature.

In the manufacture of very fine fibers and threads of glass, especially for textile purposes, small melting furnaces are generally used. Extremely good adaptability to different working conditions is obtained with such small units, and yet there is a sufficient melt capacity for the production of very fine threads at high speed. Fragments of glass are commonly used to feed these furnaces. These fragments may have different composition and different colors according to the purpose for which the fibers are to be made, and up to the present time have generally been put in by hand in small pieces.

It has been shown, however, that perfectly uniform charging of the furnace, both with respect to the quantity and size of pieces to be added and to the time intervening between the separate charges, is of the greatest importance in obtaining a uniformly high quality of glass. The introduction of these fragments at intervals of time leads to disturbances of the glass melt which result in interrupting the formation of the thread. The insertion of a particularly large fragment cools the part over the series of orifice openings or nipples which lie under it so that the glass at this point becomes too viscous and the filaments break. Their re-formation takes place only after some time, and with the formation of a drop at each orifice at which the formation of the filament was interrupted. Therefore, not only has stoppage been caused, but loose ends in the resulting strand have been formed which lower the rate and quality of production.

The introduction of too small pieces or their insertion at too long intervals of time is equally injurious for the uninterrupted production of very fine glass threads. The contents of the furnace are overheated at intervals, whereby the glass loses the viscosity which is necessary for the formation of threads. This condition also leads to broken ends. The introduction of pulverized fragments is undesirable because pulverized pieces bring a great deal of air into the fusing bath and permit the formation of bubbly glass which is unusable for the production of threads.

The charging of the furnace with large fragments of equal size is also disadvantageous, since that makes necessary a device for producing the same. The feeding of these fragments into the furnace also produces local cooling on the surface of the melt where the fragments come to rest. This cooling is due to the relatively cold fragment itself and also to the opening of the furnace which is necessary each time.

Moreover, such devices which feed powdered glass in a uniform stream or regularly drop in chunks or fragments require a complicated mechanical or electrical distributing means which must be governed by changes of level or other suitable means which are not always definite and certain.

Among the objects of the present invention is to overcome the aforesaid disadvantages and to feed glass stock automatically into the supply body at a rate commensurate with the rate at which the glass is withdrawn from the supply body for the production of glass fibers.

Another object is to maintain uniform temperatures and avoid temperature shocks during the operation of feeding.

Other objects are to provide an apparatus which is very simple, reliable and makes no demands on the reliability of the workmen who run it.

Figure 2:
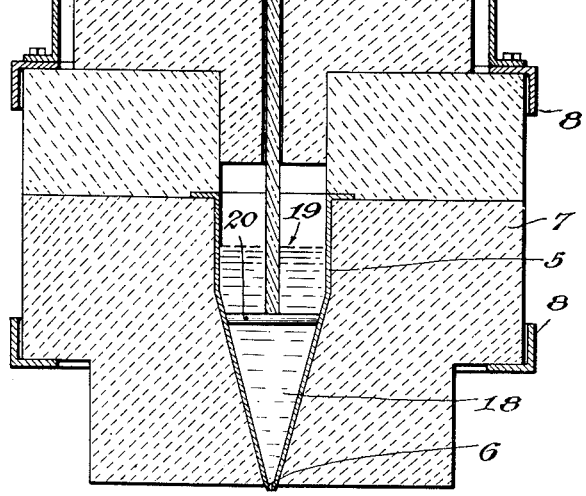

Other objects and advantages of the present invention will become apparent from the following description taken in conjunction with the drawing, in which:

Fig. 1 is a cross-sectional elevational view of a fiber glass furnace embodying the present invention; and Fig. 2 is an elevational view taken along the line II—II of Fig. 1.

The present invention contemplates feeding glass plates or other cylindrically shaped stock having any desired cross-section into the furnace by resting the forward end thereof at a predetermined level in the supply body and causing the heat of the supply body to gradually melt the said submerged forward end according to the required needs for replenishing the supply body and thus allow the stock to advance at a uniform continuous rate into the body. The term "cylinder" in this specification is intended to apply to all such shapes which are generated by the movement of a straight line traveling always parallel to itself along any predetermined curve, such as a circle, rectangle or the like. As is apparent from the drawing, glass stock in such a shape may be continuously fed into an inlet opening conforming to the cross-sectional shape of stock. It is preferably of uniform cross-sectional area throughout its length, the sides thereof being defined by straight lines parallel to the direction of movement of the stock into the supply body.

Referring now more particularly to the drawing: Reference character 5 designates a melting crucible, preferably of metal, such as platinum or the like. If desired, an ordinary clay crucible, forehearth or tank may also be used. The crucible 5 is provided at the lower end thereof with a series of outlet orifices 6 adapted to emit glass for any desired purpose. The crucible is held in a suitable refractory support 7 which may be held by framework 8. The metal crucible or container 5 is preferably electrically heated through a circuit 10 connected to terminals or lugs 11 integral with and on each end of the container 5.

Over the refractory support rests a refractory cover 12 having a vertical opening or slit 13 therethrough adapted to receive a sheet 14 of glass stock. A metal over-cover 15 having a receiving mouth or slot 16 fits over the cover 12 with the said slot 16 in register with the slit 13.

Within the crucible 5 is a supply body of molten glass 18 which rises to a predetermined level 19, in accordance with the rate of feeding through the terminals 11 and the rate of melting provided by the electrical heating means.

Disposed transversely across the crucible 5 and at a fixed level below the level 19 is a support 20 consisting in the immediate case of a series of spaced apart bars welded integrally to the crucible 5. These bars form in effect a perforate platform for the support of the advancing end of the sheet 14.

As the plate or sheet 14 of glass stock is inserted into the slot 16, it comes to rest upon the cross bars or support 20 and the forward end is subjected to the heat of the molten body into which it is submerged. Since the furnace, which is generally electrically heated, has a very definite capacity to melt, this plate melts off only to a predetermined degree. For this reason it cannot melt away prematurely, since the surface of the bath becomes too cold and thus the continuation of the melting is automatically limited. The bars or support 20 prevent the plate from sinking deeper into the melt, that is, in greater proximity to the orifices 6 to produce any cooling action there. The bars 20 also cause the weight of the advancing plate 14 to have no bearing upon the rate of melting, and it is possible to place successive plates upon one another through the slot 16.

It is also to be observed that the entrance of air to the melting pot is prevented by this manner of feeding. Moreover, there is no periodical cooling of the bath by periodic feedings of glass stock, since the glass is melted off from a continuously advancing forward end.

A further advantage is obtained by the preheating of the glass plate by the radiant heat as the plate advances to the bars.

In order to secure a uniform cooling by the plate along the entire length of the crucible, the plate 14 and its slot 16 preferably have a width substantially equal to that of the crucible.

It is possible to submerge the glass as deeply as possible by placing the bars 20 at any predetermined height. A particularly low placement of the bars causes the surfaces of the plate which are exposed to the heat to be especially large and a more rapid melting rate is achieved. The heat input into the furnace should be adjusted accordingly. By a higher placement of the bars 20 a lower rate of melting is effected.

Various modifications and variations may be resorted to within the spirit and scope of the present invention as defined in the appended claims.

I claim:

1. The process of feeding solid glass stock into a furnace for the production of seed-free glass at a uniform constant temperature which comprises, establishing a supply body of molten glass in said furnace, feeding thereinto downwardly from the upper surface thereof a piece of solid glass stock defined by substantially straight lines parallel with the direction of feeding movement to a depth whereat the molten glass body contacts substantial areas of the lower portions of the side faces of the stock, whereby the heat of the molten body melts the said lower end, and maintaining the lower end of said stock submerged in said body at a predetermined level below the upper surface of the molten body and above the bottom thereof and thereby continuously feed the said stock into said body at the same rate as the lower end is melted.

2. In apparatus for producing fibrous glass, a metal crucible having outlet orifices in the lower end thereof and side walls extending upwardly wherein a supply body of molten glass may be maintained at a constant level, means for electrically heating said crucible and the glass therein, a cover over the top of said crucible having an opening therein for the introduction of solid glass stock in the form of an elongated body whose cross-section is substantially uniform throughout the length thereof and conforms to the shape of said opening, a perforate stock support in said crucible in alignment with said opening and disposed in a position where it will be below the normal glass level in said crucible and upon which the lower end of said stock rests when submerged in said supply body, said support being adapted to cooperate with said opening to position said stock in an upwardly extending position, whereby the lower end of the stock is gradually melted by said supply body to replenish the same as it is withdrawn through said orifices.

3. The process of feeding solid glass stock into a furnace for the production of glass at a uniform constant temperature which comprises, establishing a supply body of molten glass in said furnace, introducing therein to an intermediate depth from the upper surface thereof the lower end of a piece of solid glass stock in the form of a plate having a width substantially equal to that of the supply body, to cause the molten body to contact side faces of the plate a substantial distance upwardly from the lower end thereof, whereby withdrawal of heat from the supply body by the stock is substantially uniform and the lower end of the stock is melted, and maintaining the lower end of said stock submerged in said supply body at a predetermined level between the top and bottom thereof, and thereby continuously feed said stock into the body as the lower end is melted in a manner to prevent localized chilling of the supply body across the said width.

4. In apparatus for producing fibrous glass, a melting furnace having outlet orifices in proximity to the bottom thereof and side walls extending upwardly from said bottom to contain a molten pool of glass of substantial depth, means for heating said supply body to maintain the glass as it issues through said orifices at a constant temperature, a cover over the top of said furnace having a restricted opening therein for the introduction of solid glass stock in the form of an elongate body whose cross-section is substantially uniform throughout the length thereof and conforms to the shape of said opening, a stock support in said furnace in alignment with said opening disposed in a position where it will be below the normal glass level in said furnace and substantially above said orifices and upon which the lower end of said solid glass stock rests, said support being adapted to cooperate with said opening to support the stock in an upwardly extending position, thereupon exposing a predetermined length of the lower end of said stock to the heat of said molten glass to cause the same to be gradually melted and become part of said pool in a manner to prevent localized chilling of said molten glass in proximity to said orifices.

5. The process as claimed in claim 1, wherein said stock is in the form of a glass plate.

6. The process as claimed in claim 1, wherein said stock has a rectangular horizontal cross-section and is in the form of a plate having a width substantially equal to that of the width of the supply body, whereby the withdrawal of heat from the supply body by said stock across the width thereof is substantially uniform.

7. The process of feeding solid glass stock into a furnace having small outlet orifices in proximity to the lower end of said furnace for the production of glass fibers, which comprises establishing a supply body of molten glass in said furnace having a predetermined temperature at said orifices, feeding solid glass stock in the form of a plate downwardly into the body of molten glass to submerge the lower end thereof and cause the molten body to contact side faces of the plate a substantial distance upwardly from the lower end thereof and thereby heat the stock and melt the lower end thereof, maintaining the depth to which the plate is submerged in the body uniform and the lower end of the plate sufficiently remote from the said orifices so that the temperature of the body at the orifices is not affected, and supplying heat to said supply body for transmission to said stock to melt the same.

8. Apparatus for melting and feeding glass which comprises a melting receptacle of generally elongated trough shape, feeding openings in the bottom of said receptacle, means for heating the receptacle for melting glass therein, a cover over the top of said receptacle provided with a vertically extending slot disposed parallel with the length of said trough shaped receptacle and substantially coextensive therewith, and a plurality of bars in crosswise relation with said slot located in said receptacle in a position below the normal level of molten glass therein and of sufficient strength and rigidity to support the weight of solid glass stock in the form of rectangular plates which may be introduced through said slot and into said receptacle to be supported at its lower end on said bars with the lower end thereof submerged in the molten glass, thereby causing the stock to automatically feed into the receptacle as said lower end melts.

CLAUS SIEGFRIED.